Fig. 1

Jan. 13, 1953  A. J. SCHENK  2,625,257
SPEED CONTROL OF CONVEYER DRIVES
Filed Sept. 14, 1951  6 Sheets-Sheet 2

INVENTOR.
ADELBERT J. SCHENK
BY
Farley Forster & Farley
ATTORNEYS

Jan. 13, 1953  A. J. SCHENK  2,625,257
SPEED CONTROL OF CONVEYER DRIVES
Filed Sept. 14, 1951  6 Sheets-Sheet 3

INVENTOR.
ADELBERT J. SCHENK
BY
Farley Forster & Farley
ATTORNEYS

Jan. 13, 1953  A. J. SCHENK  2,625,257
SPEED CONTROL OF CONVEYER DRIVES
Filed Sept. 14, 1951  6 Sheets-Sheet 6

INVENTOR.
ADELBERT J. SCHENK
BY
Farley Forster & Farley

Patented Jan. 13, 1953

2,625,257

UNITED STATES PATENT OFFICE 2,625,257

SPEED CONTROL OF CONVEYER DRIVES

Adelbert J. Schenk, Huntington Woods, Mich., assignor to Jervis B. Webb Company, Detroit, Mich., a corporation of Michigan Application September 14, 1951, Serial No. 246,579

36 Claims. (Cl. 198—203)

This invention relates to the speed control of driving units in multiple drive conveyor installations and is particularly directed to providing a speed control system which will operate to maintain such conveyor drives in balance at any one driving speed and which system will operate to change the over-all speed of all drives used in any conveyor system in balanced synchronism.

The system of the invention and individual component parts involved in its operation are designed for installation as auxiliary or optional equipment on both existing and future conveyor installations of this general type—that is installations where a plurality of driving units are used to propel a single conveyor line. The present invention contemplates the use of driving units of the basic type disclosed in Patent No. 1,847,152 issued March 1, 1932, to Jervis B. Webb, et al., wherein the driving mechanism is mounted on a floating frame which is supported by rollers on a fixed frame comprising part of the conveyor structure.

The application of the invention to driving units of this type, the objects of the invention and the general features thereof can be more fully appreciated by a reference to the drawings accompanying this specification which consist of the following views:

Fig. 6 is a plan view of this speed control device with the cover removed and showing additional control elements associated therewith;

Figure 1:
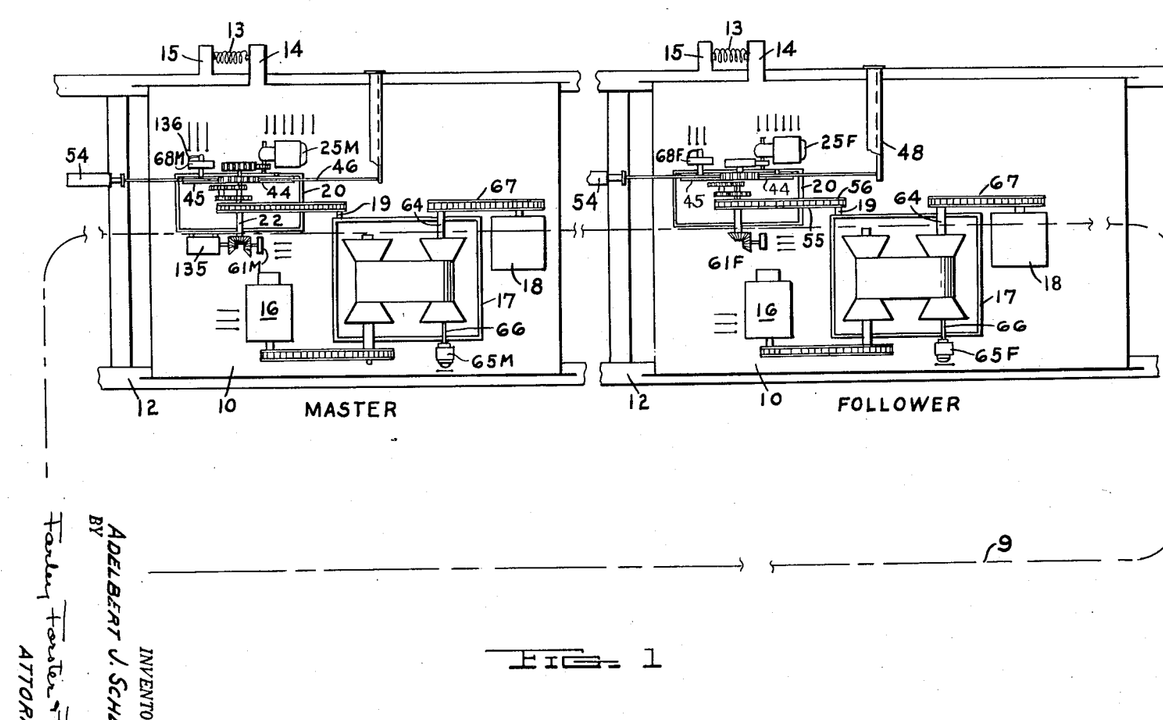
Fig. 1 is a schematic view showing a conveyor system having two driving units of the type under discussion equipped with the control mechanism of the invention.
Figure 3:
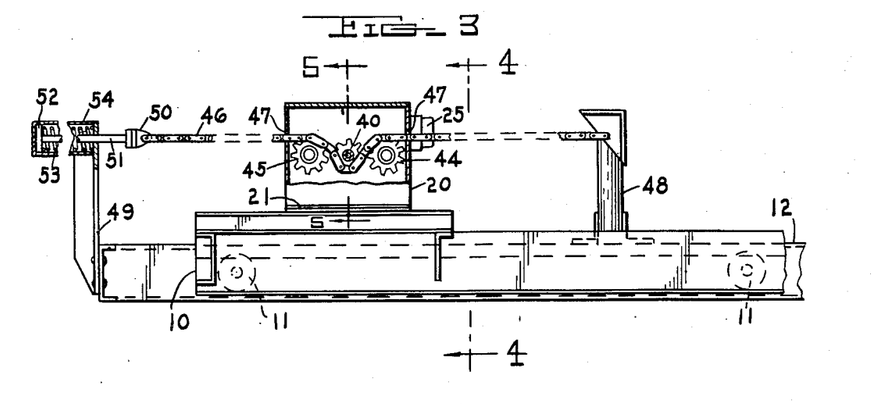
Fig. 3 is a section in elevation taken along the line 3—3 of Fig. 2.
Figure 4:
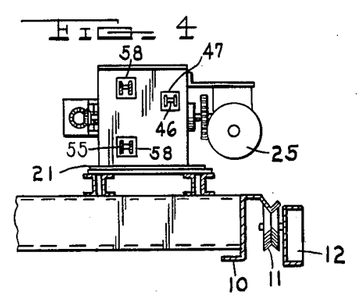
Fig. 4 is a section taken along the line 4—4 of Fig. 3.
Figure 9:
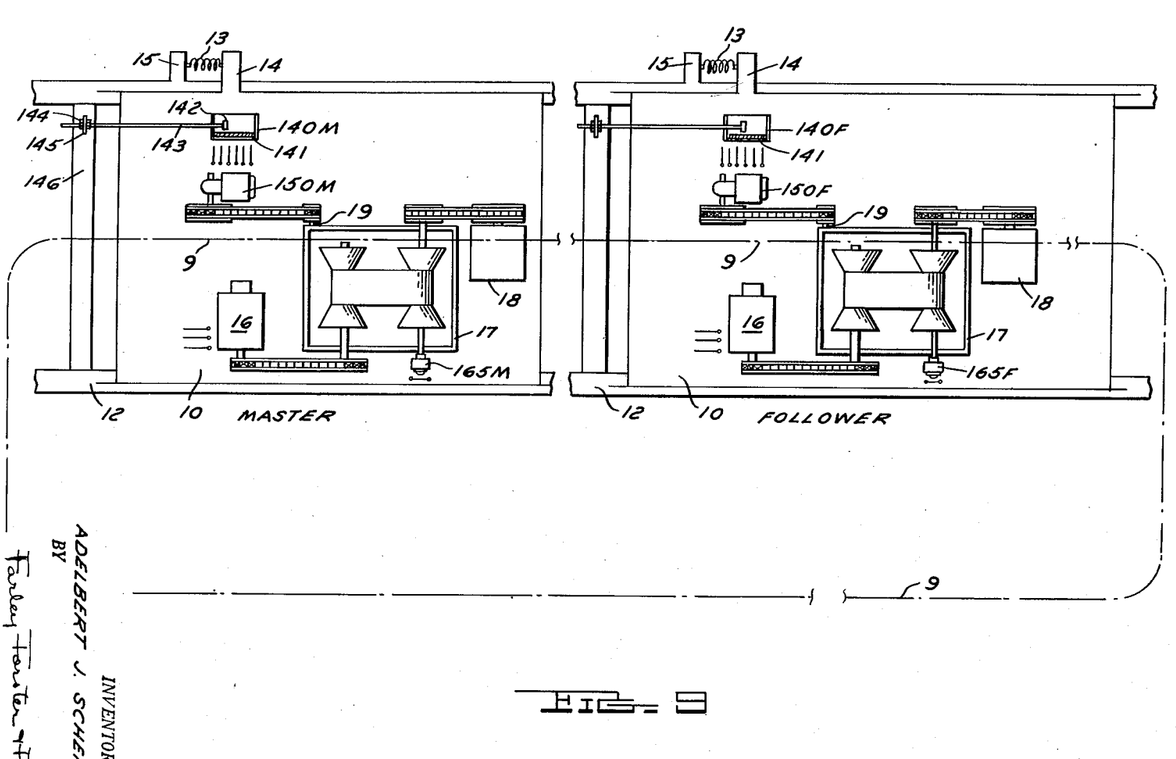
Fig. 9 is a schematic view similar to Fig. 1 illustrating an alternate form of speed control.

Referring to Figs. 1, 3 and 9 to explain the setting of the invention, a conveyor system is indicated by the broken line 9 which represents the conveyor chain. Two driving units denoted generally as Master and Follower are associated with the conveyor chain at spaced points thereon.

Each of these driving units has a suitable supporting frame 10 which rests upon a number of rollers 11 (Fig. 3) carried by a fixed structure 12 so that the frame 10 is capable of limited movement in relation to the fixed structure in a direction parallel to the path of the conveyor chain according to the teaching of the above-mentioned Webb patent, this movement being regulated by a spring 13 interposed between a member 14 carried by the frame of the driving unit and a member 15 attached to the fixed structure. Mounted on the frame 10 of each driving unit are a suitable driving motor 16, a conventional Reeves type of transmission 17 and a speed reducing unit or gear box 18, and each driving unit is designed so that the over-all speed of the output shaft of the gear box 18 is regulated by varying the driving ratio in the Reeves transmission 17. The speed of the driving motor remains substantially constant. In the conventional Reeves transmission, variation in the driving ratio is obtained through an adjusting screw 19 which accomplishes an axial movement of the driving pulleys on their shafts, and in the prior Webb Patent 1,847,152, relative movement between the frame of the driving unit and the fixed structure of the conveyor was mechanically utilized to accomplish a speed change through the Reeves transmission which would be in a direction such as to maintain that driving unit in a balanced condition relative to the speed of the conveyor as a whole.

The problem of obtaining synchronism at any one speed between multiple driving units of a conveyor system, in the sense that each driving unit will bear its proper share of the load, is influenced by a number of factors, the more important of which are as follows:

(1) Inherent variations in speed of driving motors.

(2) Variation in chain length due to wear and large manufacturing tolerances.

(3) Variations in conveyor load.

(4) In some installations, variations in the size of driving units, a larger unit being frequently employed at one or more points in the system to take care of a heavier load at that point as may be due, for example, to a change in elevation.

In any one system some of the above factors may vary widely from time to time, and without some means of balancing between drives the full advantage of using multiple units can be lost. Mounting the driving units in a floating frame, as taught by the Webb patent mentioned above, has solved this problem for any one conveyor speed because of the fact that the speed of each driving unit is correlated with the reaction exerted upon it by the conveyor chain so that if any one particular driving unit is running at too high a speed, the increased reaction from the high speed will cause the unit and its floating frame to move backwardly along the conveyor chain, this movement being opposed by the spring 13, and this movement is utilized to turn the adjusting screw 19 of the Reeves transmission to reduce the speed of the output shaft of the gear box 18. Conversely, if a driving unit is running below speed, the decreased chain reaction in conjunction with the force exerted by the balancing spring 13 will cause the floating frame to move ahead producing an increased speed of the output shaft of the gear box and resulting in the unit absorbing its share of the load of the system.

One of the main objects of the present invention is to provide improved electronic and mechanical means for translating such movement of the floating frame of a driving unit into rotation of the adjusting screw of the Reeves transmission to produce a speed change in a balancing direction.

In most conveyor installations it is desirable and necessary to be able to control the over-all speed of the system and, of course, when such an over-all speed change is made, it is also necessary that the driving units be brought to a new speed in synchronism and maintained in a balanced condition at the new speed.

This problem of over-all speed control in multiple drive conveyor systems employing self-balancing driving units of the type previously discussed has been considered in a second Patent No. 2,395,599, issued February 26, 1946, to Jervis B. Webb et al. In this patent a modification has been made to the conventional Reeves transmission to provide one speed adjusting screw adapted be driven by a separate speed changing motor and a second speed adjusting screw adapted to be rotated by movement of the floating frame of the driving unit. An auxiliary control has also been included to govern the rotation of the speed change motor so that the speed change motor of each driving unit will be caused to turn the same number of revolutions in accomplishing a speed change. A satisfactory installation of a conveyor system incorporating the features disclosed in this second Webb patent has been made. However, it has been found to have certain disadvantages, the more important of which are as follows:

(1) Because of variations between different Reeves transmissions of the same type due to wear and manufacturing tolerances, the adjustment of the speed controlling elements necessary to maintain a balanced condition throughout the speed range of the system can be extremely critical.

(2) In order to employ the structure shown in this patent it is necessary to modify the conventional Reeves transmission to install the two speed adjusting screws.

(3) The speed adjustment of the conveyor system as a whole is subject to definite limitations in that it can only be varied through fixed increments.

(4) If the conveyor system is heavily loaded or loaded in an unbalanced condition, a speed change must be very gradually made to avoid having a driving unit float to its limit of movement due to the change of reaction tending to produce that movement which accomplishes a speed change. For example, when the speed of the conveyor is being increased, each driving unit is met with an increased reaction from the conveyor chain due to acceleration, and, if the acceleration is great enough, this reaction may be sufficient to cause the driving unit to float to its limit of movement. As a safety feature, these driving units have been equipped with limit switches so that the conveyor as a whole will be shut down if any one unit floats to its working limits.

(5) In general, the initial adjustment and maintenance time necessary to maintain this adjustment during the operating life of the system is high and this type of speed control as a practical installation is satisfactory only in cases where conveyor loads are relatively light and balanced, conveyor speeds can be adjusted gradually, and fixed increments of speed change will be satisfactory for the particular operating requirements.

In view of this situation a further object of the present invention is to provide a speed control system for use with conveyor drives of the type outlined in this discussion which will have certain features and advantages not found in the Webb Patent No. 2,395,599 and which will incorporate different operating principles. This object includes the provision of a number of features, among which are the following:

(a) A speed control system, the component parts of which can be readily installed on existing drives now in operation.

(b) A speed control system which can be operated to maintain a plurality of driving units in balanced driving relationship with the conveyor at any one conveyor speed and which can also be used to accomplish a synchronized over-all speed change in all driving units:

(1) wherein the balancing operation of the system is mechanically controlled and the over-all speed changing operation of the system is electronically controlled; or, (2) wherein both balancing and over-all speed changing operations are electronically controlled.

(c) The provision of a speed control system for use with a plurality of driving units of the floating frame type, which maintains control over floating frame movement to bring all units to a new speed in a relatively balanced relationship.

(d) The provision of certain control elements which can be employed in the speed control system to obtain the type and speed control desired over the driving unit thereof.

(e) The provision of a representative type of control circuit designed to be used with the above-mentioned systems and control elements, either singly or in combination, to accomplish speed control of the type desired in various conveyor installations.

Other further objects and features of the invention will appear and be discussed in conjunction with the following description thereof. This discussion will be directed first to the mechanical-electronic control system of the invention, including the construction and operation of a speed changing unit for therein, and the selection and employment of suitable control elements for the electronic portion of the system; second, the all electronic system of the invention; third, a description of a control circuit suitable for use with either type of system; and fourth, a review of the operation of the various systems of the invention and component parts thereof.

1. MECHANICAL-ELECTRONIC SYSTEM

As mentioned in the foregoing discussion of the setting of the present invention and the general objects thereof, a system for controlling the speed of a plurality of driving units of the floating frame type under discussion must be capable of accomplishing two types of speed change, first type being minor or balancing speed corrections of each driving unit individually, caused by local variations in load upon such driving unit, and the second type being a major or over-all speed change of all the driving units of the conveyor as a whole. In this control system of the invention the first type of speed change is controlled mechanically in response to relative movement between the floating frame of any individual driving unit and the adjacent supporting structure for such frame; over-all, or second type of speed changes are controlled electronically under a basic concept of utilizing one driving unit in a system of multiple drives as a master, providing means for changing the speed of this master drive unit, providing a servo device for changing the speed of each remaining, or follower, drive unit, and employing electronic means to control the operation of the servo devices so that the speed condition of the master drive unit will be reproduced in each follower drive unit.

A system of this type is schematically illustrated in Fig. 1, and, with the type of installation thereshown, the employment of this system necessitates that means be provided for driving the speed adjusting screw 19 of each Reeves transmission 17 mechanically as a result of movement of the floating frame 10 and as the result of energization of a speed changing motor such as the motor 25m of the master unit or the motor 25f of the follower unit, the motor 25m being directly energized, while the motor 25f is energized in response to a difference between the speed condition of the follower drive unit and that of the master drive unit. The two types of speed changes, balancing and over-all, which are responsible for movement of the speed adjusting screw 19, frequently occur simultaneously, frequently separately or sequentially and means must therefore be provided to drive the speed changing screw 19 in this manner.

In order that this speed control system may be supplied as accessory equipment and installed without the necessity of major modifications to existing drive units, a separate speed changing unit is employed to transmit motion of the floating frame and/or energization of a speed changing motor into rotation of the speed control shaft 19 of the Reeves transmission.

Figure 5:
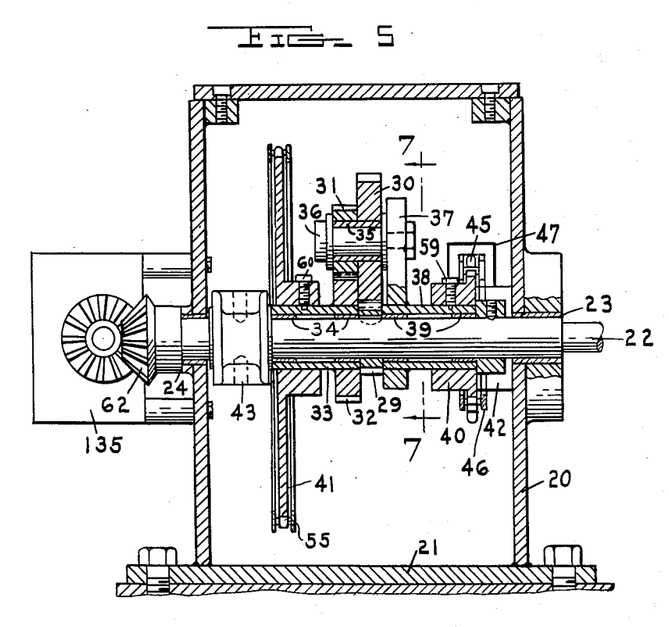
Fig. 5 is an enlarged section taken along the line 5—5 of Fig. 3, showing the internal arrangement of the speed control device of the invention.
Figure 7:
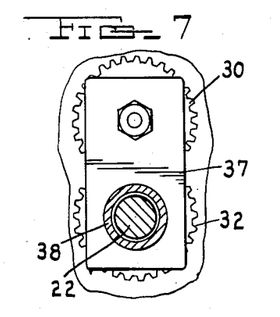
Fig. 7 is a detail sectional view taken along the line 7—7 of Fig. 5.

This speed changing unit is shown schematically in Fig. 1 in its relationship to the other elements of the driving mechanism and in detail in Figs. 2 to 7 inclusive. Referring first to Figs. 5 and 6, the speed changing unit consists of a gear box having a casing 20 welded to a bottom plate 21 which extends beyond the sides thereof. A main shaft 22 is journaled transversely of the casing 20 in bearings 23 and 24. Rotation of this shaft is effected by a suitable driving motor 25 having a driving pinion 26 driven from a gear head 27, the driving pinion 26 meshing with a gear 28 mounted on the shaft 22 externally of the casing 20. A single gear 29 is keyed to the shaft 22 within the casing and approximately midway between the side walls thereof. This gear 29 forms part of a speed reducing gear train which includes a second gear 30 in mesh with the gear 29, a third gear 31 rotating with the gear 30 and meshing with a fourth gear 32. The fourth gear 32 is fixed to a collar 33 adapted to rotate independently of the shaft 22 by being mounted thereon upon spacing bushings 34. The gears 30 and 31 are each keyed to a bushing 35 which rotates freely on a shaft 36, this shaft being bolted to a planetary arm 37 carried by and secured to a collar 38 which is also mounted for free rotation about the shaft 22 upon spacing bushings 39. A balancing speed change sprocket 40 is mounted on the collar 38 to rotate therewith and a main speed changing sprocket 41 is similarly mounted upon the collar 33. Right and left hand spacers 42 and 43, respectively, are secured to the shaft 22 adjacent the inner walls of the casing by set screws and serve to locate the foregoing speed changing elements and gear train in proper relationship upon the main shaft.

Also mounted in the gear box in line with the sprocket 40 are a pair of idler sprockets 44 and 45. As can best be seen from Figs. 1, 2 and 3, a sprocket chain 46 is trained over the idler sprockets 44 and 45 and under the balancing speed change sprocket 40. This sprocket chain extends through suitable apertures 47 in the end walls of the gear box casing 20, and, referring to Figs. 2 and 3, the right hand end of the sprocket chain is fixed to a bracket 48 carried by the fixed frame 12. The left hand end of the sprocket chain is attached to a resilient type of mounting carried by a bracket 49 also attached to the fixed frame. This resilient mounting consists merely of a clevis 50 to which the chain is attached, this clevis being mounted upon a rod 51 having a plunger 52 adapted to act against the spring 53 mounted within the cylinder or suitable housing 54.

Figure 2:
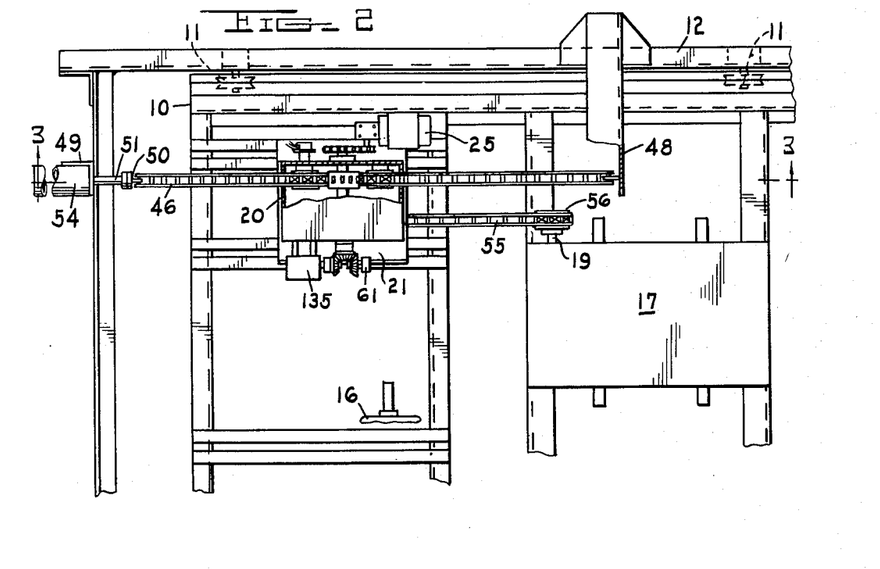
Fig. 2 is a plan view of a portion of one of such driving units enlarged to show the control mechanism of the invention in relation thereto.

Speed changes in the driving unit are effected by a second sprocket chain 55 shown in Figs. 1, 2 and 6, this sprocket chain being an endless type and trained about the main speed changing sprocket 41 within the gear box and a sprocket 56 mounted on the end of the adjusting screw shaft 19 of the Reeves transmission 17. Suitable apertures 58 are provided in the end wall of the gear box casing 20 to permit passage of this chain 55 therethrough. If any movement of the floating frame should take place when the main sprocket 41 is not free to turn, for example, if the Reeves adjusting screw 19 had reached its limit of movement, the resilient mounting described above will protect the fixed chain 48 from breakage.

The operation of this speed changing unit is in response to both the balancing type of speed changes occasioned by relative movement between the frame of the floating drive and its fixed supporting structure and also in response to actuation of the speed changing motor 25. These two types of operation will be discussed separately as follows:

(A) *Balancing speed changes*

If a load condition is imposed upon the driving unit such as to cause the floating frame thereof to move in either direction relative to the fixed supporting structure and main conveyor chain, such movement will cause rotation of both the idler sprockets 44 and 45 and the balancing sprocket 40. Since the sprocket chain 46 is fixed, these three sprockets will rotate along the chain as the driving frame moves. For the present, the result of such rotation of the idler sprockets 44 and 45 will be neglected and the discussion confined entirely to the effect of rotation of the balancing sprocket 40. This balancing sprocket is secured by a set screw 59 to the freely rotating collar 38 which in turn carries the planetary element 37. Hence, as the sprocket 40 revolves, the collar and planetary element will simultaneously revolve. Since the shaft 22 is stationary, the gear 29 keyed thereto will act as a stationary or reaction member so that the planetary movement of the element member 37 will be accompanied by rotation of the gears 30, 31 and 32, the gear 32 producing rotation of the collar 33 which in turn will rotate the main sprocket 41 fixed thereto by a set screw 60. Thus, rotation of the balancing sprocket 40 will be accompanied by a rotation of the speed changing sprocket 41, and, by reason of the intermediate elements used for translating this rotary movement, the rotation of the sprocket 41 will be in the same direction as that of the sprocket 40. Obviously, the sensitivity of the unit to such balancing movement of the drive frame can be built in according to the gear ratios used.

(B) Over-all speed change operation

A speed change of this type is obtained by actuating the speed changing motor 25, which is of a reversible type, thus producing rotation of the main shaft 22 through the motor gear train previously mentioned. This rotation will drive the main sprocket 41 through the gears 29, 30, 31 and 32 and during this rotation the planetary member 37, which carries the gears 30 and 31, will be stationary unless the over-all speed change is accompanied by a balancing movement of the conveyor drive frame. If such balancing movement does occur, the two types of speed change, balancing and over-all, may take place simultaneously by a combination of rotary movement of the shaft 22 and of the balancing sprocket 40. Preferably, the speed changing unit is equipped with a rotary type limit switch 135 mounted on the casing 20 and driven from the main shaft 22. This limit switch is a standard commercial article and hence it is unnecessary to describe the details of its construction. It operates in conjunction with the speed changing motor 25 to define the limits of the operation thereof in either direction and thus fix the high and low speed of the conveyor and prevent operation of the speed changing motor beyond the speed adjusting range of the Reeves transmission.

This speed changing unit, when used in conjunction with each drive of a multidrive conveyor installation, will act to maintain a balanced relationship between the drive units at any one conveyor speed. For over-all speed changes under the master-follower system of control, means must be added in the form of speed control elements associated with each driving unit of the system and interconnected by a suitable control circuit so that the speed condition of the master drive unit can be matched by each of the follower drive units. The term "speed control elements" used in this specification refers to a device capable of measuring the value of a factor which reflects the speed condition of a driving unit, this reference factor being such that if it is maintained at the same or approximately the same value in each drive unit of the conveyor system, the speed condition in each of such units will be properly synchronized. At least four types of reference factors or combinations of reference factors can be used, and in the discussion which follows these reference factors will be outlined, together with limitations and advantages of each, the control element or elements used to measure the value of each, and the association of such control elements with a driving unit.

The first reference factor is the position of the adjusting screw of the Reeves transmission. If all drive units are initially in a balanced condition and the adjusting screw of the Reeves of each unit is rotated the same number of turns in accomplishing a speed change, all units should come to the new speed in a balanced condition. Practically, however, certain limitations exist in using this reference factor to accomplish a speed change, and in general it may be said that best results will be achieved only in conveyor installations where the load on the conveyor system is light and reasonably uniform and the speed is changed through a limited range. For more heavily loaded conveyors the variations between the load on each drive at different speeds may be such that the drives will not reach a balanced condition at a new speed if the only adjustment made is to cause equal amount of rotation of all adjusting screws to obtain such a new speed. The same objection may be found if it is desired to adjust the drives throughout a large speed range, not only due to load variables, but also due to the inherent variation between the output of two or more driving motors and Reeves transmissions at different speeds and variation in the frictional losses between drive units at different speeds. But with limited speed change and light loads it has been found that the mechanical balancing of the floating frame type of drive units will be adequate to compensate for any actual variation between driving units when an over-all speed change is made.

In the construction illustrated in the drawings, a potentiometer 61 (see Fig. 6) is mounted upon the casing 20 and is used to indirectly indicate the position of the Reeves adjusting screw 19 by being coupled to the main shaft 22 of the speed changing unit through a pair of bevel gears 62 and 63. This location of the potentiometer 61 makes the actual reference factor the amount of rotation of the main shaft 22 of the changing unit occurring during an overall-speed change, and it is recognized that the amount of rotation of the speed adjusting screw 19 may be slightly different due to the fact that the adjusting screw is driven by the main sprocket 41 which can be independently rotated by balancing movement of the drive frame as well as by rotation of the shaft 22. As previously mentioned, the satisfactory use of this reference factor is predicated upon the existence of certain characteristics in the conveyor system—light, fairly uniform loading, and limited, gradual speed changing—and with characteristics of this type the error in synchronism resulting from balancing movement during an over-all speed change will be slightly and easily corrected by balancing movement after the new speed has been reached.

Fig. 1 illustrates the fact that potentiometer 61M and 61F are used on the speed changing unit of each drive. These potentiometers are electrically connected in a control circuit which includes the speed changing motors of each drive together with other electrical elements associated so that synchronized operation of the speed changing motors will result. Such a control circuit together with its method of operation will be discussed later in this specification.

A second reference factor that may be used is the speed of the driving units. A convenient place for measuring this speed is from the output shaft 64 of each Reeves transmission by means of tachometer generators 65M and 65F, each driven therefrom by a suitable shaft 66 as shown in Fig. 1. Since the speed reducer unit 18 of each drive is driven from the output shaft 64 through a silent type chain 67, the driving is positive and the speed of the output shaft 64 will be directly proportional to the speed of the member in engagement with the conveyor chain. Use of speed as a reference factor means that all driving units will be brought to the same speed in accomplishing an over-all speed change of the conveyor system. Proper speed changing operation is dependent upon the assumption that if the speed of all drives is equal, the drives will be in a balanced condition or in a condition where balance can be obtained by floating frame movement. This neglects the effect of movement of the floating frames which may take place during the time the speed is being changed. It has been found that such movement will invariably take place to some extent, and, if the movement is sufficient, the new speed may be reached with the floating frames of the driving units totally out of balanced relation and in a position such that they will be unable to correct for local variations in load at the new speed. This movement of the floating frames during speed change will also tend to produce hunting between the drive units and in addition, the objections and limitations mentioned in the discussion of the first reference factor are equally applicable here. These limitations and objections to both these reference factors illustrate more clearly the nature of the problem involved in successful speed changing operation and show that the object to be accomplished by the speed changing system is not merely absolute equality in the speed of each drive or absolute equality in the amount of speed change occurring in each drive, but rather the speed change must be such that the driving units arrive at a new speed in a particular relationship which involves not only speed, but also the relative position between the floating and fixed frame of each driving unit. Without this relationship in floating frame position, the driving units may not be able to perform their balancing function to take care of local variations in conveyor loads.

Thus, a third reference factor must be considered. This is the relative position between the floating and fixed frame of each driving unit. It may be measured by a potentiometer 68 (see Fig. 6) actuated from the shaft of one of the idler sprockets of the speed changing unit such as the sprocket 45. Any movement of the floating frame will be accompanied by a rotation of this sprocket 45 along the fixed sprocket chain 46, as previously described, and this rotation is used to cause a corresponding angular movement of the wiper arm 136 of the potentiometer 68. In a limited sense, this third reference factor could be termed tractive effort or chain reaction since the relative position between the floating and fixed frame of each driving unit is dependent upon the reaction between that unit and the conveyor chain. In using the term tractive effort, however, it must be realized that a speed control which maintains balance between the potentiometers 68M and 68F (see Fig. 1) does not necessarily result in maintaining equality of tractive effort between driving units or in changing speed on the basis of tractive effort equality. The units are, however, designed to maintain balance of tractive effort and this reference factor will insure that such balance is maintained throughout an over-all speed change. The principal objection is that speed changing must be accomplished gradually in order for conditions in the follower drive to keep in step with those of the master drive.

Due to the limitations to the use of each of these reference factors singly, the method of speed control preferred involves the combination of factor 2, speed of the driving units, with factor 3, relative tractive effort. The speed of the output shaft of the Reeves transmission, as indicated by the tachometer generators 65M and 65F, is used in combination with the relative position between the floating and fixed frames as indicated by the potentiometers 68M and 68F and in this manner a fast response to speed change is obtained, while at the same time all drives are placed in a balanced condition at the new speed or in a position where the intended mode of balancing operation can take place.

This preferred combination of reference factors has led to the development of a second type of speed control system, described herein as an all-electronic system. The basic elements in this all-electronic system will be briefly described at the present time with this description being followed by a description of an illustrative type of control circuit applicable to either this system or the mechanical-electronic system previously described.

2. ALL-ELECTRONIC SYSTEM

This system, illustrated schematically in Fig. 9, is based upon the application of the master-follower type of electronic control built around the employment of reference factor number 3—relative position between the floating and fixed frame. The system is termed "all-electronic" because of the fact that this method of control is applied not only for over-all speed changes of the driving units but also to accomplish any necessary balancing speed changes thereof.

Considering the representative application of this system shown in Fig. 9, where parts of the drive units corresponding to those employed in Fig. 1 have been designated by similar reference characters, if the master and follower driving units thereshown are in a balanced relationship, where each is bearing its share of the load, a definite relationship will exist in the amount of the displacements of the floating frame of each drive relative to the fixed structure supporting such frame. Considering the master drive for a moment, if the load on that drive increases from this balanced condition, causing an increased reaction and consequent movement of the floating frame toward the fixed supporting structure, and compressing the spring 13, the output of the follower drive unit should be increased so that it will absorb a portion of this load and the two units will be returned to a balanced condition where each is bearing its proper share. If this is done, the increased output of the follower drive will be accompanied by increased reaction and a movement of its floating frame corresponding to that of the master drive unit.

Assuming that the unbalanced condition first occurred in the follower drive unit and that the load upon it first increased with consequent movement of its floating frame due to the accompanying increase in reaction, then this condition could be corrected by decreasing the output of the follower and allowing some of the increase in load to be absorbed by the master. This results in the frame of the follower being returned under the influence of the spring 13, to a position corresponding to the floating frame position of the master drive, thus restoring balance.

This system of control can be applied to any existing driving unit simply by adding control elements to the master and follower unit capable of sensing relative movement between the floating and fixed frames. Such control elements are illustrated in Fig. 9 in the form of master and follower position potentiometers 140M and 140F. These potentiometers each consist of a linear coil 141 attached to the moving frame of the drive unit and a wiper 142 carried by a rod 143 adjustably secured, as by nuts 144, to a bracket 145 carried by a fixed supporting member 146.

These position potentiometers are preferably employed in the system in combination with master and follower tachometer generators 165M and 165F for the purpose, as before, of increasing the speed of response of the system. Preferably, signals obtained from the tachometer generators are employed in the control circuit governing the operation of the follower servo motor 25F to provide viscous damping.

This will be more apparent from the description of the representative control circuit which follows.

3. CONTROL CIRCUIT

A satisfactory control circuit for use with either of the foregoing systems must include means for the direct actuation of the speed changing motor of the master drive and means for actuating the speed changing motor of the follower drive in response to unbalanced conditions between the control elements of the master and follower units.

Figure 8:
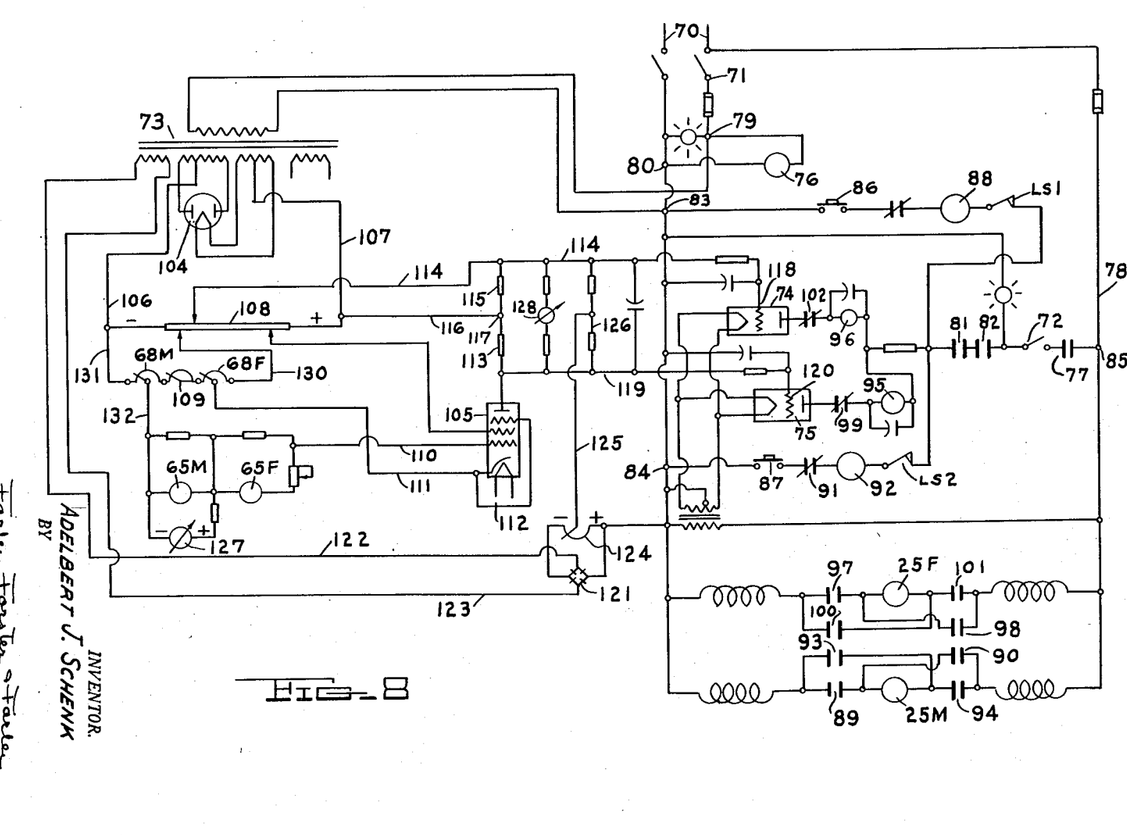
Fig. 8 is a circuit diagram illustrating a representative type of control circuit which may be used in regulating the over-all speed of a conveyor having multiple driving units.

A satisfactory control circuit of this type and which incorporates both of the reference factors, speed and tractive effort, is shown in Fig. 8. This circuit has been designed for use with a system incorporating only two drives, but once the principles upon which the operation is based are understood, it can be readily appreciated by those skilled in the art that the circuit and the elements thereof can be multiplied to take care of a greater number of driving units. In setting up this circuit for two drives, one of them is arbitrarily selected as a master. Tachometer generators 65M and 65F (Fig. 1), or 165M and 165F (Fig. 9), and potentiometers 68M and 68F (Fig. 1), or 140M and 140F (Fig. 9), are mounted so that each tachometer gives a reference voltage which reflects the speed of the output shaft of its drive, while each potentiometer gives a reference voltage which reflects the position of the floating frame of its drive relative to the stationary frame thereof. The circuit has been designed for operation from a 115 volt line 70 through a main switch 71. A second switch 72 is also included as a safety element. Switch 72 can be opened for safety purposes when performing maintenance work on the circuit, otherwise it is normally closed.

The principal elements in this circuit consist of a transformer 73, thyratrons 74 and 75, and, for the installation of Fig. 1, the master potentiometer 68M, the follower potentiometer 68F, the master tachometer 65M, the follower tachometer 65F, the master speed change motor 25M and the follower speed change motor 25F. For the installation of Fig. 9, the speed change motors, position potentiometers, and tachometer generators thereof are substituted, otherwise, the following description of the circuit elements, confined for simplicity to Fig. 1, is unchanged for Fig. 9.

A time delay relay 76 having a contact 77 in series with the circuit from the thyratron to the return line 78 is connected to the source of supply between points 79 and 80. When switch 71 is closed and the time delay relay is energized and after sufficient time has passed to allow other elements in the circuit to warm up, its contact 77 is closed. Contacts 81 and 82 which are shown in series with switch 72 and time delay relay contact 77 are closed by the operation of the conveyor drive motors and hence with the closing of time delay relay contact 77 a circuit is established between points 83 and 84 and point 85 on line 78. This circuit extends through fast and slow push buttons 86 and 87, respectively, which manually control the operation of the master speed change motor 25M. Push button 86 operates a relay 88 which controls the position of motor contacts 89 and 90 which, when closed, energize the master motor for rotation in a clockwise direction. Relay 88 also controls the opening of normally closed contact 91 in series with the slow push button 87. The slow push button 87 by energizing relay 92 has a similar action since this relay controls the closing of normally opened contacts 93 and 94 to energize the master motor for counterclockwise rotation. Limit switches LS1 in series with the fast push button 86 and LS2 in series with the slow push button 87 are included for the purpose of stopping the master speed change motor when the drive unit has reached its maximum speed change in a fast or slow direction, respectively.

Rotation of the follower speed change motor 25F is similarly controlled by fast and slow relays 96 and 95 actuated by the thyratrons 74 and 75, respectively. Relay 96 operates normally open contacts 97 and 98 in the motor circuit and normally closed contact 99 in series with the slow relay 95, while this latter relay operates normally opened contacts 100 and 101 in the motor circuit and normally closed contact 102 in series with the fast relay 96.

Control of the operation of the thyratrons is through the reference factors of Reeves output shaft speed and floating frame position previously mentioned. A rectifier tube 104, connected to the secondary of the transformer 73, provides power for the operation of the control portion of this circuit, this power being fed through lines 106 and 107 to a bleeder resistor 108 where it is divided into suitable values by connections to other elements in the circuit. The first of these connections establishes a reference voltage to an amplifier tube 105 and consists of lines 150 and 131 to which the master and follower potentiometers 68M and 68F are connected in series along with a third potentiometer 109 which acts as a balance control. The master and follower tachometer generators 65M and 65F are connected in bucking relationship in a circuit comprising line 132 leading from the wiper of the master potentiometer 68M and line 110 leading to the amplifier tube 105 so that the difference in voltage between the two tachometers will affect the potential in line 110 according to the magnitude and polarity of such voltage difference. The other input connection to the amplifier consists of line 111 from the wiper of the follower potentiometer 68F. Thus, the voltage difference between lines 110 and 111 represents the input potential to the amplifier 105 and will be increased or decreased from a reference value, which obtains when the control elements are in balance and conditions in the master potentiometer 68M and tachometer generator 65M are matched by those in the corresponding follower control elements 68F and 65F, according to the nature of the variance from such balanced condition.

The reference value of this input voltage, as amplified, which is shown by the voltage drop across a resistor 113, is matched by a bucking voltage across a resistor 115 supplied from the bleeder resistor 108 through lines 114 and 116. With the control elements in balance and the amplifier input voltage at reference value, the potential at point 117 between resistors 115 and 113 will be zero. If the input voltage, due to relative conditions between the control elements, exceeds the reference value, the voltage across resistor 113 will exceed the bucking voltage and current flow through line 114 to the grid 118 of thyratron 74, while if the input voltage becomes less than the reference value, current will flow through line 119 to the grid 120 of thyratron 75.

Since it is a characteristic of the thyratron type of tube to be maintained inactive by a negative grid voltage, a rectifier 121 is provided and also connected to the secondary of transformer 73 by lines 122 and 123. This rectifier is equipped with a sensitivity control in the form of a potentiometer 124, and the rectifier output as controlled by this potentiometer is fed through lines 125 and 126 to lines 114 and 119 and the grids 118 and 120 of each thyratron. The negative voltage thus supplied to each of these grids is, therefore, opposed by the voltage produced by an unbalanced condition of the control elements and, if this latter voltage is of sufficient amplitude, the negative charge on the grid of either thyratron will be reduced to the point where the thyratron will fire, thereby closing the relay and actuating the follower speed change motor 25F through the circuits previously described.

4. OPERATION

With the mechanical-electronic system, this control circuit is operated only when changing the over-all speed of the conveyor. At all other times the circuit is inactive and each driving unit, through balancing movement of its floating frame, maintains itself in proper relationship with the remaining drives, assuming its share of the load. When an over-all speed change is desired, the control circuit is energized by closing switch 71, and after the thyratrons and other elements of the circuit have been allowed to warm up by the time delay relay 76, either the fast push button 86 or slow push button 87 may be held in as long as necessary to bring the master drive to the desired new speed. (A voltmeter 127, calibrated in conveyor speed, may be provided and operated by the master tachometer generator 65M). As soon as this speed change in the master drive begins to take place, the voltage generated by the master tachometer generator 65M will differ from that of the follower tachometer generator 65F, the amplifier input voltage will vary from its reference value, and one of the thyratrons 74 and 75 will be actuated, causing a corresponding speed change in the follower drive unit by energizing the follower speed change motor 25F. Any movement of the floating frame of the master drive, caused by this speed change, will produce an unbalanced relationship between the master potentiometer 68M and the follower potentiometer 68F, will also affect the amplifier input voltage and hence the operation of the thyratrons and the follower speed change motor. When the master drive unit has reached its new speed, the condition of the follower drive is indicated by a balance meter 128 connected between the lines 114 and 119 so as to read any difference in voltage therebetween. When conditions in the follower drive, both speed and floating frame position, are matched with those set up in the master, the circuit will be in balance, there will be no difference in potential between lines 114 and 119 and the balance meter will read zero. The control circuit may then be de-energized by opening switch 71 and the drives left to operate at the new speed under the mechanical balancing action of their floating frames.

In the all-electronic system the control circuit is kept energized all the time. Its operation in producing an over-all speed change is the same as in the other system, but balancing speed changes are brought about primarily through the operation of the master and follower position potentiometers 140M and 140F, respectively. When the system is installed, a balanced relationship between the potentiometers 140M and 140F is set up based upon a certain position of each floating frame relative to its fixed supporting structure, or in other words, a certain position of the wiper 142 of each potentiometer along the coil 141 thereof. Any movement of the floating frame of either the master or follower drive unit will disturb this balanced relationship between the control elements and the control circuit will act to energize the speed change motor 150F of the follower unit to restore the balanced relationship between the position potentiometers. Speed correction thus produced in the follower unit will naturally be transmitted back through the chain and have an effect upon the load imposed upon the master drive unit. For example, if the output of the follower dive unit is decreased to restore balance, additional load will be thrown upon the master drive unit, and movement of its floating frame will result, but because of the amount of time usually required for this reaction to take place a need exists for some form of damping in order to prevent overcorrection of the follower and continual movement of the floating frames. The signals obtained from the tachometer generators 165M and 165F are used for this purpose. The outputs of these generators, being connected in the control circuit in the same manner employed for the outputs of the tachometer generators 65M and 65F there illustrated, are in series with the outputs of the position potentiometers 140M and 140F, these being connected in a manner similar to that shown for the position potentiometers 68M and 68F. Thus, the difference in output of the tachometer generators 165M and 165F can augment or oppose the error signal resulting from a difference in position of the floating frame of the follower relative to that of the master. Assuming such a position difference occurs as the result of a load variation, a speed correction of the follower unit will be made. This speed correction will be immediately accompanied by an error signal resulting from a difference in the output of the follower tachometer generator 165F compared to that of the master tachometer generator 165M, and this error signal will show that the follower is out of synchronized speed relationship with the master and will oppose the error signal resulting from the position difference. The correction will thus be made gradually and the master unit will be given time to react to the correction, gradually bringing the system back to a new condition of equilibrium.

It can thus be seen, in comparing the two systems, mechanical-electronic and all-electronic, that while they operate in a similar manner to accomplish over-all speed changing, their mode of operation in accomplishing balancing speed changes is quite different. In the balancing operation of the mechanical electronic system, each drive unit is independent and is free to change its output, within the limit of movement of its floating frame, to take care of variations in the reaction between it and the chain. The chain, of course, acts to transmit the effects of a speed correction in any one drive unit on to the other drive units of the installation but each of these other drive units individually react. No problem of hunting, as such, exists, although the freedom of action of each independent drive unit does present another problem—that is the fact that a change of reaction on any one unit could conceivably be great enough to cause it to move to one of its limits of movement thereby tripping a limit switch usually provided for shutting down the whole system to prevent damage to the drive unit in just such an eventuality. The possibility of this happening with the all-electronic type of installation is remote because here, due to the fact that each follower drive unit is made to match the condition existing at the master, the response of the system as a whole to any load variation upon a particular drive unit is more immediate. In other words, the electronic control anticipates the chain in transmitting a change of reaction upon one driving unit to the remaining units of the installation.

These differences point to a third possible method of operation of the control system of the invention which is useful either in a case where due to an extreme hunting problem trouble would be encountered in properly controlling the all-electronic installation, or in a case where due to extreme local load variations trouble would be encountered in the mechanical-electronic system due to frequent shutdowns caused by one of the units actuating its limit switches.

This other method of operation involves using the mechanical-electronic system with the control circuit thereof continuously energized and with a reduced degree of sensitivity of the position potentiometers. In other words the degree of error between the position of the frame of the follower drive unit compared to the position of the frame of the master drive unit, necessary in order to obtain a signal of sufficient strength to be transposed by the control circuit into a corrective energization of the servomotor of the follower, is increased. Thus a certain amount of movement of the follower frame from the relative position then existing in the master frame will be accompanied only by a speed correction mechanically induced through rotation of the sprocket 40 of the speed control device along the chain 46. Any position error beyond this degree, however, will produce an error signal from the position potentiometers sufficient to produce actuation of the servomotor 25F through the operation of the control circuit. Mechanical balancing is therefore employed for a normal range of speed correction, with each unit accomplishing its balancing correction independently. Beyond this normal range, the electronic system takes over to bring all units back into a relative position within the normal range.

This same control circuit can be used in installations where it is desirable to employ only one of the reference factors previously discussed; for example, if it is desirable to use the position of the Reeves adjusting screw as a reference factor, the potentiometer 61M and 61F can be substituted for the potentiometers 68M and 68F and the tachometer generators 65M and 65F can be eliminated along with their connections in the circuit. Also, if it is desired to use only the potentiometers 68M and 68F as control elements, the tachometer generators can be correspondingly eliminated, and, if the tachometer generators alone are to be used as control elements, they can be connected to the transformer 73 through the resistor 103 eliminating the potentiometers 68M and 68F. Since control circuits of this type have been commonly employed, it is considered that modifications of the type outlined above to provide for operation with single or other combinations of control elements are well within the capabilities of those skilled in the art.

This application is a continuation in part of my prior copending application, Serial Number 27,080, filed May 14, 1948, and entitled "Speed Control of Conveyor Drives."

I claim:

1. For use with a plurality of driving units arranged to jointly propel a single driven member, wherein each of said driving units includes a variable speed device and is mounted on a frame supported by a fixed structure for limited movement in the direction of the reaction between such driving unit and the driven member propelled thereby, such movement being opposed by means for absorbing said reaction and urging said frame in the opposite direction; speed controlling means comprising servo means for actuating the variable speed device of each of said driving units excepting the variable speed device of one driving unit designated master, a control element associated with each of said driving units and responsive to movement of the frame thereof, and control means for energizing each servo device, each control means including the control element of said master drive unit and the control element and servo device of a remaining drive unit.

2. Speed controlling means as set forth in claim 1 further including a second control element associated with each of said driving units and responsive to the output speed thereof and wherein each control means includes said second control element of said master drive unit and the said second control element of one of the remaining drive units.

3. Speed controlling means as set forth in claim 1 further including a second control element associated with each of said driving units, the said second control element of said master drive unit and of a remaining drive unit being included in said control means, said second control elements being connected in series with said first mentioned control elements.

4. Speed controlling means as set forth in claim 1 further including means for directly actuating the variable speed device of said master drive unit.

5. Speed controlling means as set forth in claim 1 wherein said control element comprises a potentiometer including a coil and a wiper and means for producing relative movement therebetween in response to movement of said frame relative to said fixed structure, the output of said potentiometer associated with said master unit being substantially equal to the output of the said potentiometer of a remaining unit when each unit is delivering its proper share of the load required to propel said driven member.

6. Speed controlling means as set forth in claim 1 further including means adapted to independently actuate the said variable speed device of each driving unit in response to movement of the frame thereof.

7. Speed controlling means as set forth in claim 6 wherein the said means for independently actuating the variable speed device of each driving unit includes a fixed member carried by the adjacent supporting structure for such driving unit, a movable member carried by the frame of such driving unit in engagement with said fixed member whereby movement of said movable member accompanies movement of the frame of such driving unit, and means for actuating the variable speed device of said driving unit in response to movement of said movable member.

8. For use with a plurality of driving units arranged to jointly propel a single driven member, wherein each of said driving units includes a variable speed device and is mounted on a frame supported by a fixed structure for limited movement in the direction of the reaction between said driving unit and the driven member propelled thereby, such movement being opposed by means for absorbing said reaction and urging said frame in the opposite direction, speed controlling means comprising servo means for actuating the variable speed device of each of said driving units excepting the variable speed device of one driving unit designated master, means for directly actuating the variable speed device of said master driving unit, a control element associated with each of said driving units, said control element being responsive to a change in the value of a reference factor which reflects the speed condition of the driving unit, a control circuit for energizing each servo device, each control circuit including the control element of said master drive unit and the control element and servo device of a remaining drive unit.

9. Speed controlling means as set forth in claim 8 wherein said control element comprises a device responsive to a change in the relative position between the frame of a drive unit and the said supporting structure therefor.

10. Speed controlling means as set forth in claim 8 wherein the said variable speed device comprises a variable ratio transmission and the said control element comprises a device responsive to a change in the ratio thereof.

11. Speed controlling means as set forth in claim 8 wherein the control element associated with each of said driving units is responsive to a change in the relative position between the frame of such driving unit and the supporting structure therefor, wherein each driving unit has associated therewith a second control element responsive to the speed of said driving unit, the said second control elements of said master driving unit and a remaining driving unit being included in the control circuit for energizing the servo device of such remaining driving unit.

12. Speed controlling means as set forth in claim 8 further including means for independently actuating the variable speed device of each driving unit in response to relative movement between the frame of such unit and the supporting structure therefor.

13. Speed controlling means as set forth in claim 12 wherein the said means for independently actuating the variable speed device of each driving unit includes a fixed member carried by the adjacent supporting structure for such driving unit, a movable member carried by the frame of such driving unit in engagement with said fixed member whereby movement of said movable member accompanies movement of the frame of such driving unit, and means for actuating the variable speed device of such driving unit in response to movement of said movable member.

14. Speed controlling means as set forth in claim 8 further including means for independently actuating the variable speed device of each driving unit in response to relative movement between the frame of such unit and the supporting structure therefor, said means operating independently of the action of said control circuit.

15. Speed controlling means as set forth in claim 8 further including means for independently actuating the variable speed device of each driving unit in response to relative movement between the frame of such driving unit and the supporting structure therefor, said means operating independently of the action of said control circuit between limits of movement of said frame intermediate the maximum limits of movement thereof.

16. In a conveyor system having multiple driving units for imparting motion to an endless conveyor, each of said driving units comprising a frame mounted for limited motion longitudinally of said conveyor upon a suitable supporting structure, driving mechanism including a variable speed transmission caried by said frame and a reaction member interposed between said frame and said supporting structure; a speed control device associated with each driving unit, said speed control device having an output member in driving relationship with the ratio adjusting device of said variable speed transmission, a speed control motor in driving relationship with said output member, means whereby said output member may be driven by relative movement between said frame and said supporting structure, a control element responsive to a change in speed associated with each driving unit, and a control circuit connecting the speed control motor and control element of each driving unit, said control circuit including means for directly energizing the speed control motor of one driving unit and means whereby the speed of the remaining driving units will be changed in response to a change in speed of said first driving unit.

17. In a conveyor system having multiple driving units for imparting motion to an endless conveyor, each of said driving units comprising a frame mounted for limited motion longitudinally of said conveyor upon a suitable supporting structure, driving mechanism including a variable speed transmission carried by said frame and a reaction member interposed between said frame and said supporting structure; a speed control device associated with each driving unit, said speed control device having an output member in driving relationship with the ratio adjusting device of said variable speed transmission, a speed control motor in driving relationship with said output member, means whereby said output member may be driven by relative movement between said frame and said supporting structure, each driving unit having associated therewith a control element responsive to the relative position between said frame and said supporting structure and a second control element responsive to the speed of said driving unit, and a control circuit connecting the speed control motor and control elements of each driving unit, said control circuit including means for directly controlling the speed of one of said driving units and means for causing a corresponding variation in the speed of the remaining driving units in response to an unbalanced condition between the control elements of said first driving unit and the control elements of said remaining driving unit.

18. The invention as defined in claim 16 in which the control element associated with each driving unit is responsive to a change in the relative position between said frame and said supporting structure.

19. The invention as defined in claim 16 in which the control element associated with each driving unit is responsive to a change in the driving ratio of said variable speed transmission.

20. In combination with a plurality of driving units of the floating frame type described, means for producing a speed change in each of said driving units whereby said driving units are brought to a new speed in a balanced relationship comprising a speed changing motor associated with each driving unit, a speed measuring device connected to each driving unit, a position sensing device responsive to movement of the floating frame of each driving unit and a control circuit connecting said speed changing motors, speed measuring and position sensing devices, said control circuit including means for directly operating the speed changing motor of one of said driving units and for controlling the operation of the speed changing motors of the remainder of said driving units in response to unbalanced conditions between the speed measuring and position sensing devices of said one driving unit and the speed measuring and position sensing devices of the remaining driving units.

21. A speed controlling device for use with a conveyor drive unit of the type which incorporates means for varying the output speed and means for sensing the degree of tractive effort between the conveyor drive unit and the conveyor member propelled thereby; said device comprising a gear box including a rotatable output member and mechanism for producing rotation of said output member in response to the application of motive power from an external source and/or a change in the tractive effort between said conveyor driving unit and the conveyor propelled thereby, and means for varying the speed of said conveyor drive unit in response to rotation of said output member.

22. A speed controlling device as set forth in claim 21 wherein the mechanism included in the construction of said speed controlling device for producing rotation of said output member comprises a first rotatable input member motivatable from an external source of power and a second rotatable input member motivatable in response to a change in the tractive effort between said conveyor driving unit and the conveyor propelled thereby.

23. A speed controlling device as set forth in claim 21 wherein the mechanism included in the construction of said speed controlling device for producing rotation of said output member comprises a first rotatable input member motivatable from an external source of power, a second rotatable input member motivatable in response to a change in the tractive effort between said conveyor driving unit and the conveyor propelled thereby, and gearing for producing rotation of said output member in response to either simultaneous or sequential movement of said input members.

24. A speed controlling device for use with a conveyor driving unit of the type carried by a frame mounted for limited movement relative to a stationary supporting structure in response to a change in the tractive effort between such driving unit and the conveyor member propelled thereby, said driving unit including a variable ratio transmission for controlling the output speed thereof; said device being adapted to be mounted on said frame of such driving unit and comprising a gear box including a rotatable output member and mechanism for producing rotation of said output member in response to movement of the frame of said driving unit, said mechanism including a rotatable input member, a flexible reaction member adapted to be mounted upon said stationary supporting structure and to engage said input member, and means for connecting said output member in driving engagement with the ratio adjusting means of said variable ratio transmission.

25. A speed controlling device as set forth in claim 24 wherein said flexible reaction member comprises a sprocket chain mounted between spaced points on said stationary supporting structure and having a portion of the length thereof trained about said rotatable input member.

26. A speed controlling device for use with a conveyor driving unit of the type carried by a frame mounted for limited movement relative to a stationary supporting structure in response to change in the tractive effort between such driving unit and the conveyor member propelled thereby, said driving unit including a variable ratio transmission for controlling the output speed thereof; said device being adapted to be mounted on said frame of such driving unit and comprising a gear box including a rotatable output member and mechanism for producing rotation of said output member in response to the application of motive power from an external source and/or movement of the frame of said driving unit, and means for connecting said output member in driving engagement with the ratio adjusting means of said variable ratio transmission.

27. A speed controlling device as set forth in claim 26 wherein the mechanism included in the construction of said speed controlling device for producing rotation of said output shaft comprises a first rotatable input member adapted to be motivated by an external source of power and a second rotatable input member adapted to be motivated by movement of said frame of such driving unit.

28. A speed controlling device as set forth in claim 26 wherein the mechanism included in the construction of said speed controlling device for producing rotation of said output shaft comprises a first rotatable input member adapted to be motivated by an external source of power and a second rotatable input member adapted to be motivated by means for sensing movement of said frame of such driving unit, said sensing means comprising a flexible reaction member adapted to be mounted on said stationary supporting structure and with a portion of the length thereof in engagement with said second input member.

29. Means for controlling the speed of a plurality of driving units arranged to jointly propel a single driven member wherein each of said driving units is of the type which incorporates means for varying the output speed thereof and means for sensing the degree of tractive effort between such driving unit and the driven member propelled thereby, said speed controlling means comprising a speed controlling device associated with each of said driving units, said speed controlling device including a rotatable output member and first and second rotatable input members, mechanism for producing rotation of said output member in response to simultaneous or sequential movement of said input members, means for producing a corresponding speed change in all of said driving units collectively, comprising means for directly energizing the first input member of the speed controlling device of one driving unit designated master, servo means for energizing the first input member of the speed controlling device of each remaining driving unit, a control element responsive to a speed reference factor associated with each driving unit, a control circuit connecting the control element of said master driving unit with the control element and servo means of each remaining driving unit, and means for causing a balancing speed change in each of said driving units individually comprising means for rotating said second input member of the speed controlling device of each driving unit in response to a change in the tractive effort between such driving unit and the driven element.

30. Speed controlling means as set forth in claim 29 wherein the means for causing a corresponding speed change in all of said driving units collectively includes a plurality of control elements associated with each driving unit, each of said control elements being responsive to a reference factor indicative of the speed condition of such driving unit.

31. Speed controlling means as set forth in claim 29 wherein the means for causing a corresponding speed change in all of said driving units collectively includes a plurality of control elements associated with each driving unit, one of said control elements being responsive to a change in the speed of such driving unit and another of said control elements being responsive to a change in the degree of tractive effort of such driving unit.

32. Speed controlling means as set forth in claim 29 wherein the control element associated with each driving unit is responsive to a change in the speed of such driving unit.

33. Speed controlling means as set forth in claim 29 wherein the control element associated with each driving unit is responsive to a change in tractive effort.

34. Means for controlling the speed of a plurality of driving units arranged to jointly propel a single driven member wherein each of said driving units is carried by a frame mounted for limited movement on a supporting structure in response to a change in the tractive effort of such driving unit, and wherein each of said driving units includes a device for varying the output speed thereof, said speed controlling means comprising means for directly operating the speed varying device of one driving unit designated master, servo means for operating the speed varying device of each of the remaining driving units, a control element responsive to a change in the relative position between said frame and the supporting structure therefor associated with each driving unit, a control circuit connecting the control element of said master driving unit with the control element and servo means of each remaining driving unit, and means carried by each driving unit for operating the speed varying device thereof in response to a change in the tractive effort between such driving unit and said driven member, said last-named means being mechanically actuated upon movement of said frame resulting from such change in tractive effort.

35. Means for controlling the speed of a plurality of driving units arranged to jointly propel a single driven member wherein each of said driving units is of the type which incorporates means for varying the output speed thereof and means for sensing the degree of tractive effort between such driving unit and the driven member propelled thereby, said speed controlling means comprising a speed controlling device associated with each of said driving units, said speed controlling device including a rotatable output member and first and second rotatable input members, mechanism for producing rotation of said output member in response to simultaneous or sequential movement of said input members, means for producing a corresponding speed change in all of said driving units collectively, comprising means for directly energizing the first input member of the speed controlling device of one driving unit designated master, servo means for energizing the first input member of the speed controlling device of each remaining driving unit, a control element responsive to a speed reference factor associated with each driving unit, means for energizing the servo means of each remaining driving unit including the control element of said master driving unit and the control element of such remaining driving unit, and means for causing a balancing speed change in each of said driving units individually comprising means for rotating said second input member of the speed controlling device of each driving unit in response to a change in the tractive effort between such driving unit and the driven element.

36. For use with a plurality of driving units arranged to jointly propel a single driven member, wherein each of said driving units includes a variable speed device and is mounted on a frame supported by a fixed structure for limited movement in the direction of the reaction between said driving unit and the driven member propelled thereby, such movement being opposed by means for absorbing said reaction and urging said frame in the opposite direction, speed controlling means comprising servo means for actuating the variable speed device of each of said driving units excepting the variable speed device of one driving unit designated master, means for directly actuating the variable speed device of said master driving unit, a control element associated with each of said driving units, said control element being responsive to a change in the value of a reference factor which reflects the speed condition of the driving unit, and means for energizing each servo device, each servo device energizing means including the control element of said master drive unit and the control element and servo device of a remaining drive unit.

ADELBERT J. SCHENK.

REFERENCES CITED

The following references are of record in the file of this patent:

UNITED STATES PATENTS

| Number | Name | Date |
| --- | --- | --- |
| 1,847,152 | Webb et al. | Mar. 1, 1932 |
| 2,076,202 | Lewellen et al. | Apr. 6, 1937 |
| 2,117,484 | Lewellen et al. | May 17, 1938 |
| 2,395,599 | Webb et al. | Feb. 26, 1946 |